(12) United States Patent
Sjoberg

(10) Patent No.: US 10,964,032 B2
(45) Date of Patent: Mar. 30, 2021

(54) METHOD AND CAMERA ARRANGEMENT FOR MEASURING A MOVEMENT OF A PERSON

(71) Applicant: PHOTON SPORTS TECHNOLOGIES AB, Umea (SE)

(72) Inventor: Jonas Sjoberg, Umea (SE)

(73) Assignee: PHOTON SPORTS TECHNOLOGIES AB

( * ) Notice: Subject to any disclaimer, the term of this patent is extended or adjusted under 35 U.S.C. 154(b) by 0 days.

(21) Appl. No.: 16/614,435

(22) PCT Filed: May 30, 2018

(86) PCT No.: PCT/SE2018/050543
§ 371 (c)(1),
(2) Date: Nov. 18, 2019

(87) PCT Pub. No.: WO2018/222120
PCT Pub. Date: Dec. 6, 2018

(65) Prior Publication Data
US 2020/0202539 A1    Jun. 25, 2020

(30) Foreign Application Priority Data
May 30, 2017    (SE) .................................. 1750669-2

(51) Int. Cl.
*H04N 5/232*    (2006.01)
*G06T 7/246*    (2017.01)
(Continued)

(52) U.S. Cl.
CPC ............ *G06T 7/246* (2017.01); *G01S 7/4868* (2013.01); *G01S 17/894* (2020.01); *G06T 7/50* (2017.01);
(Continued)

(58) Field of Classification Search
CPC ..... H04N 5/232121; G06T 7/246; G06T 7/50; G06T 2207/30196; G01S 17/894; G01S 7/4868
(Continued)

(56) References Cited

U.S. PATENT DOCUMENTS

2004/0008394 A1    1/2004    Lange et al.
2004/0167709 A1    8/2004    Smitherman et al.
(Continued)

FOREIGN PATENT DOCUMENTS

CN    106646500    5/2017
EP    3163321    5/2017
(Continued)

OTHER PUBLICATIONS

Patent Cooperation Treaty (PCT), International Search Report and Written Opinion for Application PCT/SE2018/050543 filed May 30, 2018, dated Sep. 12, 2018, International Searching Authority, EP.

*Primary Examiner* — Michael Lee
(74) *Attorney, Agent, or Firm* — McDonald Hopkins LLC

(57) ABSTRACT

The present disclosure relates to a camera arrangement (100) for measuring a movement of a person (150). The camera arrangement (100) comprises a camera (110) and is arranged to repeatedly determine at least one distance (120) between at least one area (160) on the person (150) and corresponding pixels in the camera (110) based on light (130) received from the at least one area (160). The camera arrangement (100) is adapted to receive different signal strengths between the corresponding pixels in the camera (110) and pixels in the vicinity of the corresponding pixels so that at least some of the corresponding pixels and the pixels in the vicinity of the corresponding pixels are neither over- nor underexposed. The camera arrangement (100) is adapted to base the determining of the at least one distance (120) on at least some of the corresponding pixels and the pixels in the vicinity of the
(Continued)

corresponding pixels which are neither over- nor underexposed.

14 Claims, 3 Drawing Sheets

(51) Int. Cl.
  *G06T 7/50* (2017.01)
  *G01S 17/894* (2020.01)
  *G01S 7/486* (2020.01)
(52) U.S. Cl.
  CPC ............. *H04N 5/232121* (2018.08); *G06T 2207/30196* (2013.01)
(58) Field of Classification Search
  USPC .......................................................... 348/196
  See application file for complete search history.

(56) References Cited

U.S. PATENT DOCUMENTS

| | | | |
|---|---|---|---|
| 2011/0058183 A1* | 3/2011 | Nakajima | G01B 11/24 356/625 |
| 2012/0027266 A1* | 2/2012 | Ren | G06K 9/00604 382/117 |
| 2012/0176476 A1 | 7/2012 | Schmidt et al. | |
| 2012/0176576 A1* | 7/2012 | Hosoya | G02F 1/136213 349/138 |
| 2013/0010278 A1 | 1/2013 | Ohmuro | |
| 2013/0050426 A1 | 2/2013 | Sarmast et al. | |
| 2013/0235364 A1* | 9/2013 | Kyung | G01S 17/50 356/5.01 |
| 2014/0037135 A1 | 2/2014 | Kutliroff et al. | |
| 2014/0168369 A1 | 6/2014 | Crane et al. | |
| 2016/0364015 A1* | 12/2016 | Send | G01S 17/86 |

FOREIGN PATENT DOCUMENTS

| | | |
|---|---|---|
| WO | 2016075945 | 5/2016 |
| WO | 2017082826 | 5/2017 |

* cited by examiner

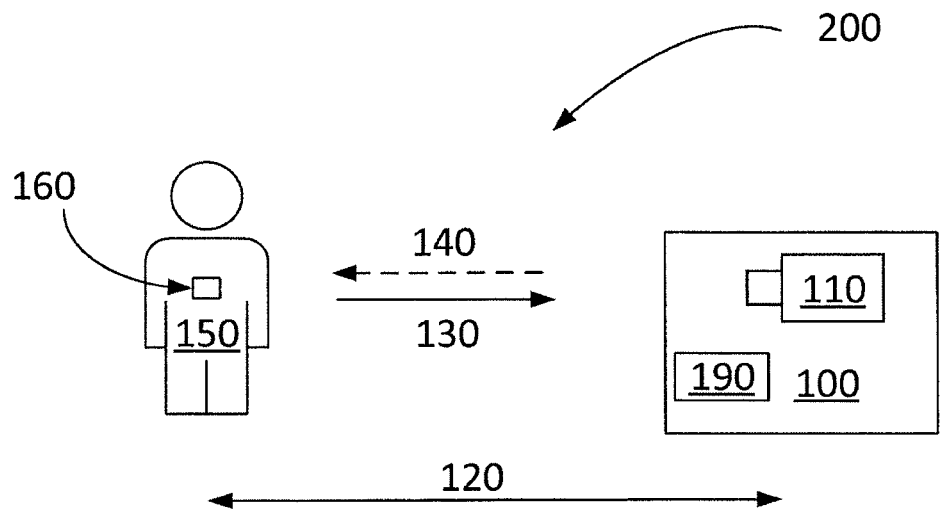
Fig. 1
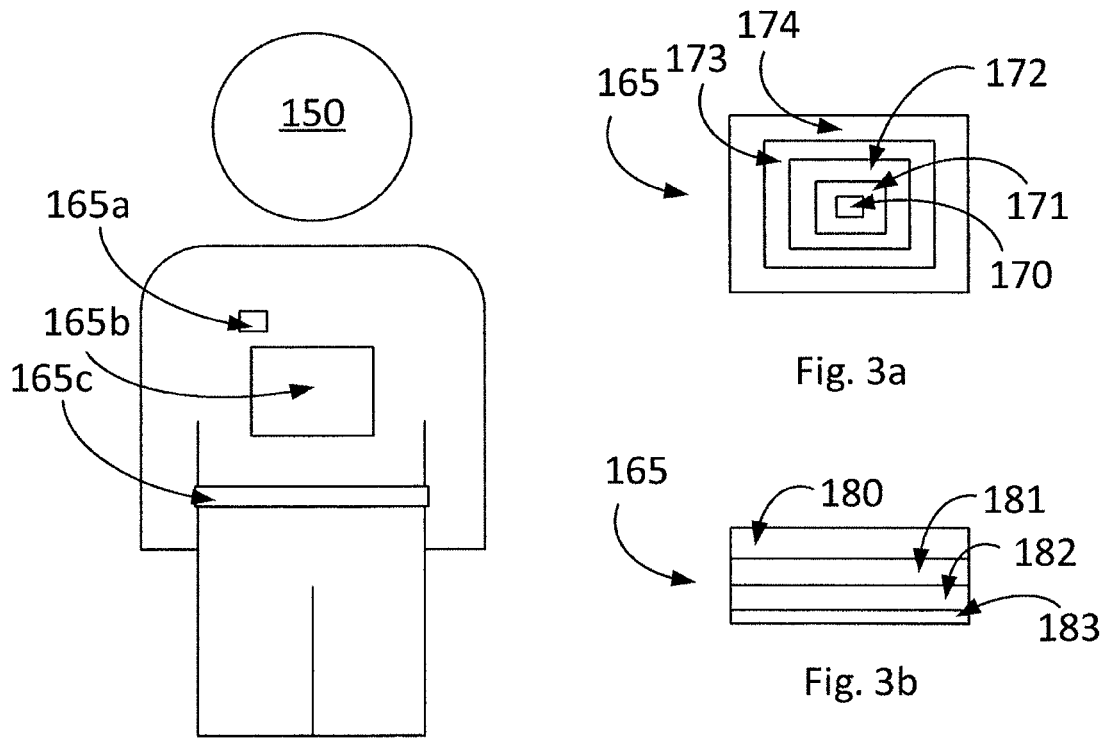
Fig. 2
Fig. 3a
Fig. 3b

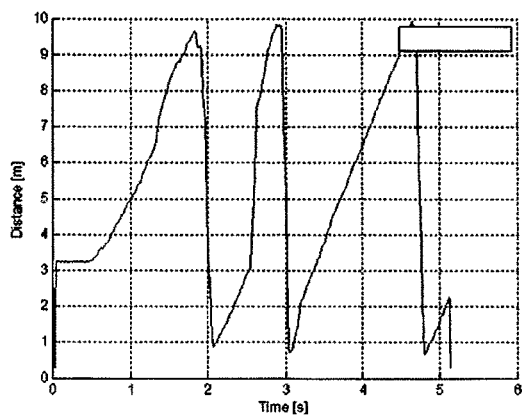
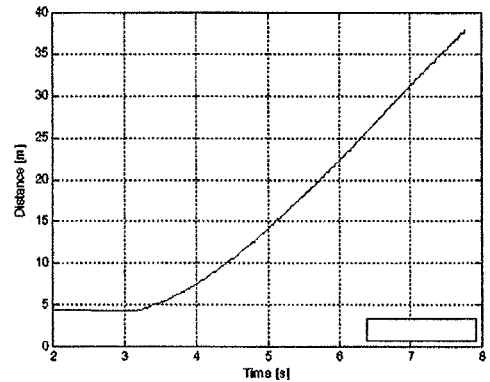
Fig. 4a · Fig. 4b
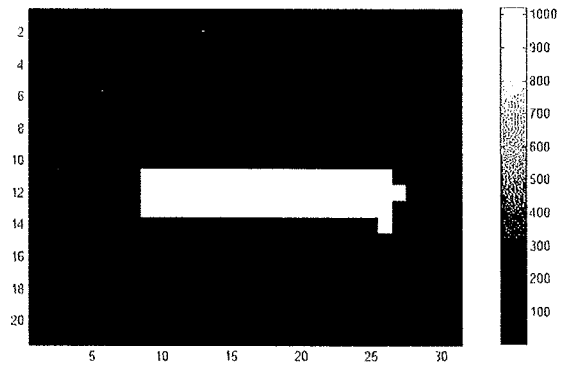
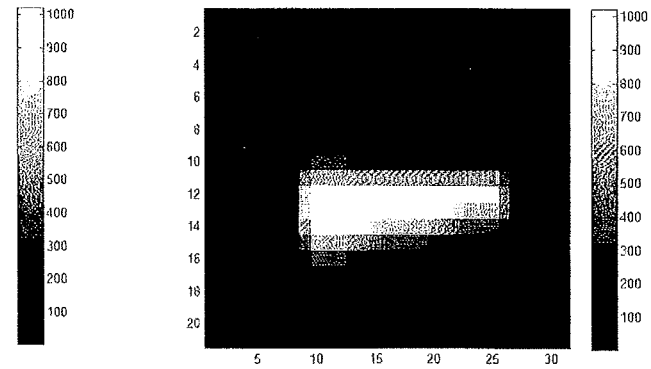
Fig. 5a · Fig. 5b
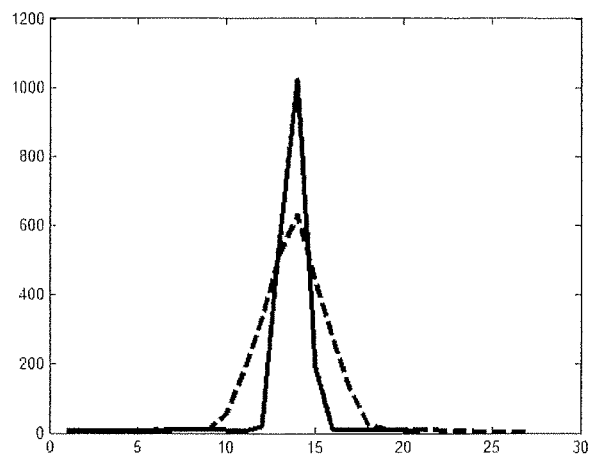
Fig. 5c

METHOD AND CAMERA ARRANGEMENT FOR MEASURING A MOVEMENT OF A PERSON

CROSS-REFERENCE TO RELATED APPLICATION

This application is a 35 U.S.C. § 371 national stage application of PCT Application No. PCT/SE2018/050543 filed on May 30, 2018, entitled "METHOD AND CAMERA ARRANGEMENT FOR MEASURING A MOVEMENT OF A PERSON," which claims priority to Swedish Patent Application No. 1750669-2 filed on May 30, 2017, each of which are incorporated herein in their entirety by reference.

TECHNICAL FIELD

The present disclosure relates to a method and a camera arrangement for measuring a movement of a person. The present disclosure further relates to a system and a computer program product for measuring a movement of a person.

BACKGROUND ART

Movements of persons need to be analysed in different areas such as physiotherapy or sports. By analysing the movement of a person one can, for example, decide what kind of training needs to be performed. Even in other areas such as some kind of electronic games the movement of a person needs to be analysed.

There is an increasing need in improving this analysis by making it faster, more detailed, or the like. There are some systems available for making such an analysis. One example is stop watches. They are, however, often not accurate enough and usually not automated. Another example is photocells or photogates. They are well established, but can only give intermediate results and no continuous information in between the photocells. Yet another example is motion capture systems, which, however, often are expensive and quite complex. Also lidar or radar systems are often complex and expensive. Further, they can usually only be used for analysing movement in only one direction. Other solutions are so called wearables. One group of wearables is based on GPS. They are, however, often comparably slow and often not accurate enough. Another group of wearables is based on accelerometers and gyros. They can work quite well for local movements of parts of the body, but are less suitable for global movements of the body.

Yet another technique is based on cameras, especially so called time-of-flight cameras, TOF-cameras. They can in principle analyse 3D-data of moving objects. However, they have several drawbacks. One drawback is that movements in general only can be analysed at distances of around 5-10 metres from the camera. This is due to the fact that the signal strength becomes too low for longer distances. Longer distances would further require stronger signals, improved efficiency of the sensor and/or the optical system, or longer exposure times, which results in the fact that a person usually moves too much during the exposure time which makes measurements uncertain. Further, it might be difficult to find the right object in the 3D-data. Another problem is the so-called wrapping. As an example continuous wave or phase difference TOF-camera having a modulation frequency of 15 MHz results in the fact that the light travels around 20 metres per period, or a distance of 10 metres between camera and object since the light has to travel back and forth. Thus, a distance between camera and object of approximately 2 metres, 12 metres, 22 metres, and so on, would give the same result. Yet another problem with TOF-cameras is that they often need comparably high lowest signal strength for performing an acceptable analysis. This lowest signal strength is often considerably higher than the noise level. As a result, the dynamic range, i.e. the difference between the lowest and the highest signal strength for which the camera can give reasonable results, is often quite limited. For several TOF-cameras on the market, the difference between the lowest and the highest signal strength for which a reasonable measurement can be performed is a factor of approximately 10. Since the signal strength scales with approximately one over the distance squared, this implies that the distance which can be analysed in a reasonable way can only differ between a factor of approximately 3 between the shortest and the longest distance, such as, for example, 3-10 m, or 10-30 m. Thus, an analysis between 1-10 m, or 5-50 m, or the like, is not possible in a reasonable way, even in case the signal strength would somehow be sufficient for these distances and not too low as discussed above.

One method for covering large differences in target brightness used today is multiple exposures, on full frame or possibly on pixel level, with varying exposure time. This can be compared to so-called high dynamic range, HDR, imaging for colour photography. Two or more exposures are used to build up the full image. This, in general, tends to lead to higher power consumption, slower framerates and an increase in total exposure time. This can result in larger motion artefacts.

There is thus a need to improve existing technology for measuring the movement of a person, for example via accurate position or distance measurement of the person.

SUMMARY OF THE INVENTION

It has also turned out that another effect limiting the performance of TOF cameras, both valid for continuous wave TOF and pulsed TOF cameras, is partial reflection. Partial reflections appear due to multiple reflections and/or scattering and results in that the light may reach the a person and/or an object and/or a sensor along several paths. This may lead to erroneous measurements and is particularly evident when measuring less bright objects at longer distances when bright objects are present within the illuminated area(s).

It has further been turned out that for many existing time of flight cameras/sensors pixels imaged at or near an edge between two objects or two parts of the same object can give erroneous measurements. This is especially true for edges with either different reflectivity, e.g. white and dark grey, or different 3D positions, distance. This is especially true if the measured objects or surfaces are moving during exposure.

One objective of the present disclosure is to provide an improved arrangement, system, method, computer program product, and computer-readable medium for measuring a movement of a person.

One objective of the present disclosure is to provide an arrangement, system, method, computer program product, and computer-readable medium for measuring a movement of a person which alleviates at least some of the problems of prior art.

One objective of the present disclosure is to provide an alternative arrangement, system, method, computer program product, and computer-readable medium for measuring a movement of a person.

At least some of the objectives are achieved by a camera arrangement for measuring a movement of a person. The camera arrangement comprises a camera and is arranged to repeatedly determine at least one distance between at least one area on the person and corresponding pixels in the camera based on light received from the at least one area. The camera arrangement is further adapted to receive different signal strengths between the corresponding pixels in the camera and pixels in the vicinity of the corresponding pixels so that at least some of the corresponding pixels and the pixels in the vicinity of the corresponding pixels are neither over- nor underexposed. The camera arrangement is adapted to base the determining of the at least one distance on at least some of the corresponding pixels and the pixels in the vicinity of the corresponding pixels which are neither over- nor underexposed.

By assuring that there are pixels which are neither over- nor underexposed, a distance measurement is enabled for larger ranges of distances. This allows to extend the range of distances for which the arrangement can be used. Thus, a larger flexibility when using the camera arrangement and a larger possible area of application for the camera arrangement is achieved.

In one embodiment, the camera arrangement comprises a defocusing arrangement. The defocusing arrangement is adapted to defocus light received by the camera, so that different signal strengths between the corresponding pixels in the camera and pixels in the vicinity of the corresponding pixels are received so that at least some of the different signal strengths do neither relate to over- nor to underexposure. This allows for an easy implementation of the idea of the present disclosure. The defocusing arrangement is adapted to defocus light in at least one direction/dimension In one embodiment, the camera arrangement comprises a diffraction arrangement. The diffraction arrangement is adapted to diffract light. The diffracting arrangement is adapted to diffract light received by the camera in at least one direction, so that different signal strengths between the corresponding pixels in the camera and pixels in the vicinity of the corresponding pixels are received so that at least some of the different signal strengths do neither relate to over- nor to underexposure. This allows for an easy implementation of the idea of the present disclosure.

In one embodiment, the camera arrangement comprises a refraction arrangement. The refraction arrangement is adapted to refract light. The refraction arrangement is adapted to refract light received by the camera in at least one direction, so that different signal strengths between the corresponding pixels in the camera and pixels in the vicinity of the corresponding pixels are received so that at least some of the different signal strengths do neither relate to over- nor to underexposure. This allows for an easy implementation of the idea of the present disclosure.

In one embodiment, the camera arrangement comprises a diffusor arrangement. The diffusor arrangement is adapted to diffuse light. The diffusor arrangement is adapted to diffuse light received by the camera in at least one direction, so that different signal strengths between the corresponding pixels in the camera and pixels in the vicinity of the corresponding pixels are received so that at least some of the different signal strengths do neither relate to over- nor to underexposure. This allows for an easy implementation of the idea of the present disclosure.

In one embodiment, the camera is a time of flight camera.

In one embodiment, the arrangement is adapted to repeat the determining at least 5 times per second, more preferably at least 10 times per second, and even more preferably at least 20 times per second. This allows for detailed analysis of the movement of a person.

At least some of the objectives are achieved by a system for measuring a movement of a person. The system comprises a camera arrangement according to the present disclosure. The system further comprises a light transmitter at the person. The light transmitter is arranged to transmit light from the at least one area on the person to the camera arrangement. This allows for a setup which is easy to implement and allows flexibility. In this disclosure the term transmitting can comprise any conveying. Thus, the term transmitting can relate to emitting and/or reflecting, and/or any other meaning of the term transmitting. The same relates to related expressions such as transmitter, transmit, or the like.

In one embodiment, the light transmitter is a retro-reflective element. This allows to easily differ the light transmitted from the area from any other possible light impinging on the camera, thus reducing possible sources of errors. Further, it enables to have a bright spot in the camera for which the distance should be measured. This makes it easy to identify the light transmitter in the camera.

In one embodiment, the retro-reflective element comprises different zones with different reflectance. This is a specific example in how the disclosure can be used to extend the difference ranges which can be measured.

At least some of the objectives are achieved by a method for measuring a movement of a person. The method comprises the step of transmitting light from at least one area on a person to a camera arrangement which comprises a camera. The method further comprises the step of determining at least one distance between the at least one area on the person and corresponding pixels in the camera based on the transmitted light. The method even further comprises the step of adapting the transmitted light in such a way that different signal strengths between the corresponding pixels in the camera and pixels in the vicinity of the corresponding pixels are achieved, so that at least some of the corresponding pixels and the pixels in the vicinity of the corresponding pixels are neither over- nor underexposed. The determining of the at least one distance is based on at least some of the corresponding pixels and the pixels in the vicinity of the corresponding pixels which are not overexposed. The steps of the method are repeated. The term distance in this disclosure can relate to a distance in one, two, or three dimensions.

In one example, the method further comprises the step of sending light from the camera arrangement to the at least one area on said person. The at least one area is equipped with at least one retro-reflective marker, and the transmitting of light from the at least one area to the camera arrangement is achieved via the retro-reflective marker which reflects back the sent light from the camera arrangement.

In one example, the method further comprises the step of defocusing the transmitted light in the camera arrangement such that the adapting is achieved.

In one example, the method further comprises the step of compensating for potential wrapping based on at least one previously determined distance. This allows for a more accurate distance measurement.

At least some of the objectives are achieved by a computer program product comprising instructions which, when the program is executed by a computer, cause the computer to carry out the method according to the present disclosure.

At least some of the objectives are achieved by a computer-readable medium comprising instructions which, when executed by a computer, cause the computer to carry out the method according to the present disclosure.

The system, the vehicle, the computer program and the computer program product have corresponding advantages as have been described in connection with the corresponding examples of the method according to this disclosure.

Further advantages of the present invention are described in the following detailed description and/or will arise to a person skilled in the art when performing the invention.

BRIEF DESCRIPTION OF THE DRAWINGS

For a more detailed understanding of the present invention and its objects and advantages, reference is made to the following detailed description which should be read together with the accompanying drawings. Same reference numbers refer to same components in the different figures. In the following, FIG. 1 shows, in a schematic way, an arrangement and a system according to one embodiment of the present invention;

FIG. 2 shows, in a schematic way, a part aspect of the present disclosure;

FIG. 3a shows, in a schematic way, an embodiment of a light transmitter which can be used in connection to the present disclosure;

FIG. 3b shows, in a schematic way, an embodiment of a light transmitter which can be used in connection to the present disclosure;

FIG. 4a shows, in a schematic way, the result of a measurement of a movement of a person according to a prior art solution;

FIG. 4b shows, in a schematic way, the result of a measurement of a movement of a person according to an example of the present disclosure;

FIG. 5a shows, in a schematic way, a possible image of a camera which could be achieved with a prior art solution;

FIG. 5b shows, in a schematic way, a possible image of a camera which could be achieved according to an example of the present disclosure;

FIG. 5c shows, in a schematic way, a comparison between an aspect of the present disclosure and a prior art solution.

DETAILED DESCRIPTION

Figure 6:
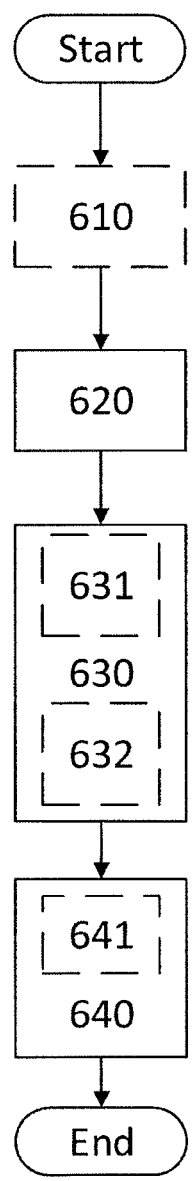
FIG. 6 shows, in a schematic way, a flowchart of an example of a method according to the present disclosure.

FIG. 1 shows, in a schematic way, an arrangement 100 and a system 200 according to one embodiment of the present disclosure. The system 200 comprises the arrangement 100. The arrangement 100 is a camera arrangement comprising a camera 110, and will in the following only be denoted arrangement 100. The arrangement 100 can comprise more than one camera 110. The arrangement 100 is an arrangement for measuring the movement of a person 150. The arrangement 100 can be arranged for measuring the movement of more than one person 150. The arrangement 100 can be arranged to measure the movement of a person 150. The person 150 can be any person. Examples of a person 150 are athletes or any other persons performing a sport, persons undergoing physiotherapy, persons performing electronic games, or the like. The idea of the present disclosure is in principle applicable to measure the movement of any person.

In one example, the term measuring a movement relates to measuring a distance 120 between the arrangement 100, or any part comprised in the arrangement 100 such as the camera 110 or a part of the camera 110, and the person 150 or at least a part of or on the person 150, such as an area 160 on the person 150. In one example, the arrangement 100 is adapted to stand still during operation. Then, a change in the measured distance 120 relates directly to the movement of the person 150 or a part thereof. In one example, the arrangement 100 is moving. The arrangement 100 can comprise means to determine the movement of the arrangement 100. The movement of the person 150 or parts thereof can then be achieved by compensating for the movement of the arrangement 100. The movement of the arrangement 100 can be determined by any suitable means. Examples are accelerometers, gyros, speed determining means, rails or the like constraining the movement of the arrangement in only one direction, or any other suitable means.

The person 150 can comprise more than one area 160. The arrangement 100 is arranged to repeatedly determine at least one distance 120 between at least one area 160 on said person and corresponding pixels in the camera 110 based on light 130 received from the at least one area 160. In one example, said at least one area 160 is a light source. The light source can be a pulsed light source. In one example, said at least one area 160 can be comprised in a retro-reflective element 165. This retro-reflective element 165 is in the following denoted retro-reflective marker 165, but it should be understood that the term marker includes any suitable element. The retro-reflective marker 165 is described in more detail in relation to FIGS. 2, 3a, and 3b.

The term "corresponding pixels" relates in this disclosure to those pixels on which said at least one area is represented in the camera 110 in case a sharp image of the at least one area is produced in the camera 110, or would be represented in the camera assuming a sharp image of the at least one area would be produced in the camera 110.

The camera 110 can be a so-called time-of-flight camera, TOF-camera. The TOF-camera can be a camera based on continuous wave modulated TOF. The camera can be a 3D camera. The camera arrangement 100 can be arranged to determine the at least one distance at least five times per second, preferably at least ten times per second, more preferably at least 20 times per second, even more preferably at least 30 times per second, and yet even more preferably at least 50 times per second.

The arrangement 100 is adapted to receive different signal strengths between the corresponding pixels in the camera 110 and pixels in the vicinity of the corresponding pixels. Herein, the term signal strength relates to the intensity of the incoming light. In most nowadays cameras the intensity of the incoming light at a pixel is transferred into an electric signal. The electric signal is in general proportional to the intensity of the incoming light. This is at least true as long as the light intensity is well above the noise level of a sensor in the camera 110 and sufficiently below a maximum resolvable level of the sensor. The case when a sensor or any other element in the camera receives its maximum resolvable level of light intensity is in this disclosure denoted as overexposure. The noise level or any other level which is too low for determining a reliable distance is denoted as underexposure.

The arrangement 100 is adapted to receive different signal strengths between the corresponding pixels in the camera 110 and pixels in the vicinity of the corresponding pixels in such a way that at least some of the corresponding pixels and the pixels in the vicinity of said corresponding pixels are neither over- nor underexposed.

In one example, this is achieved by a defocusing arrangement (not shown). The defocusing arrangement can be a part of the camera 110 and/or the arrangement 100. The defocusing arrangement can be adapted to defocus light received by the camera, so that different signal strengths between the corresponding pixels in the camera and pixels in the vicinity of the corresponding pixels are received. In a simple example, it can be assumed that only one area 160 transmits light to the camera 110 above noise level. Without the defocusing arrangement, there would only the area 160 be visible as an image in the camera. In case the area 160 would transmit the light with equal intensity above its area to the camera, thus the signal strength, i.e. the light intensity, at the corresponding pixels will all have basically one and the same level, in the following denoted a first level, whereas all other pixels would have basically the lowest signal strength, in the following denoted a second level. With the help of the defocusing arrangement, the incoming light intensity can be distributed among more pixels. Thus, the pixels which would show the area without the defocusing arrangement, i.e. the pixels which are denoted corresponding pixels, can remain having a signal strength corresponding to the first level in case the intensity of the incoming light was well above the overexposure level, or can have a signal strength being lower than the first level in case the intensity of the incoming light was at least in the same order of magnitude as the overexposure level. The pixels in the vicinity of the corresponding pixels will then have a signal strength which is higher than the second level. This is due to the fact that some of the light which would have reached the corresponding pixels without defocusing arrangement now is spread out to the pixels in the vicinity of the corresponding pixels. Therefore, at least some of the pixels in the vicinity of the corresponding pixels will have a signal strength which is somewhere in between the first and the second level. Thus, at least some of the pixels in the vicinity of the corresponding pixels are neither over- nor underexposed. As a consequence, different signal strengths between the corresponding pixels in the camera and pixels in the vicinity of the corresponding pixels are received. This is elaborated further in relation to FIG. 5a-c. The defocusing arrangement can be arranged to defocus the light in only one direction, such as only in a horizontal, a vertical, or a diagonal direction. The defocusing arrangement can be arranged to defocus the light in several directions. The defocusing arrangement can comprise at least one lens, such as at least one astigmatic lens and/or at least one anamorph lens. The defocusing arrangement can comprise a diffusor. The term defocusing arrangement can also comprise the situation of a camera 110 and/or arrangement 100 which is specifically designed for providing a non-sharp image. The at least one lens is preferably a solid lens, i.e. no liquid lens. This simplifies control and calibration procedures. In one example, the at least one lens defocuses in only one direction. As an example, the at least one lens can be a cylinder lens.

In one example, the defocusing arrangement comprises a diffractive element which diffracts in basically only one dimension. This can assure that light is spread only in a desired direction. As an example, when measuring movements of a sprinter, it is usually known beforehand in which direction the sprinter is moving. The arrangement might then, for example, be adapted to defocus light in a direction dependent of the main moving direction of the object. This direction might be parallel or perpendicular to the main moving direction. As an example, in case of a jump in basically the vertical direction, the defocusing arrangement can be arranged to defocus basically in the vertical direction.

In one example, the defocusing arrangement is adapted to prevent or at least to reduce spreading light between the object and the background. An example is the belt 165c described later on in relation to FIG. 2. Moving away in a vertical direction from the belt 165c will still be on the body of a person 150. Thus, a moving in the vertical direction can still be considered to be part of the object and will thus usually have the same distance. Moving from the belt 165c in the horizontal direction will, however, soon lead to an image of the background, especially in case the person 150 slightly raises arms, which is a typical movement when running. It is advantageous to defocus the light in a direction where further light from adjacent pixels still belongs to the object, such as in the vertical direction in FIG. 2. Defocusing in a direction where the light will mix with background light, such as in the horizontal direction in FIG. 2, can produce pixels with heavily varying values as sometimes the determined at least one distance might be the distance of the object and sometimes the distance of the background. In some examples, defocusing in two directions might be possible as well while still assuring to be on the object. This might, for example, be the case with element 165b described later on in relation to FIG. 2.

In one example, the defocusing arrangement is calibrated before using the arrangement. This allows to have a higher repetition rate when determining the at least one distance as compared to, for example, dynamic calibration. Further, this can reduce motion artefacts, especially when switching between different zones as described in relation to FIG. 3a and FIG. 3b.

In one example, the arrangement 100 is arranged to transmit light 140 to the at least one area 160 which is part of the retro-reflective element 165 which comprises different zones with different reflectance from which the light 130 is transferred back to the arrangement 100. This is another example of how the receiving of different signal strengths between the corresponding pixels in the camera 110 and pixels in the vicinity of the corresponding pixels in such a way that at least some of the corresponding pixels and the pixels in the vicinity of said corresponding pixels are neither over- nor underexposed can be achieved. This example can be used instead or additionally to the previous example. The retro-reflective element with different zones is explained in more detail in relation to FIG. 3a-b.

The system 200 comprises a light transmitter at said person being arranged to transmit light 130 from the at least one area 160 on the person to the arrangement 100. The light transmitter can be a light source. The area 160 can be the light source, or a part of the light source. The light source can be any suitable light source which can be attached at a person. The light transmitter can be a retro-reflective element 165. The retro-reflective element comprises different zones with different reflectance. This is further described in relation to FIGS. 2, 3a, and 3b. The area 160 can be a zone of the retro-reflective element.

The arrangement 100 is adapted to base the determining of the at least one distance on at least some of the corresponding pixels and the pixels in the vicinity of the corresponding pixels which are neither over- nor underexposed. In general, a distance measurement is difficult or impossible to perform in a reliable way based on over- or underexposed pixels. Thus, by assuring that at least some pixels among the corresponding pixels and/or the pixels in the vicinity of the corresponding pixels are neither over- nor underexposed, it is possible to determine the distance based on those pixels. This is in contrast to prior art solutions where areas outside a certain range of a distance to the camera basically only produced over- or underexposed pixels and thus made it difficult or impossible to determine a distance.

In one example, the arrangement 100 is adapted to compensate for so-called wrapping. This is in one example achieved based on at least one previously determined distance and/or an a priori known distance. As an example, for a certain time period between determining a distance one can assume that a person cannot move more than a certain distance. As an example, even the best sprinters have so far not run faster than 50 km/h. Thus, at a repetition rate of 5 measurements per seconds it can be assumed that a person has not moved more than 3 metres between different measurements. This assumption can then be used for compensating for the wrapping as will be further described in relation to FIG. 4a-b. It should be emphasised that the value of 3 metres is only an example and that this value can be adapted to the kind of movement under investigation and the repetition rate. As an example, shot-put will require other kinds of movements than sprints and can thus also have different maximum speeds of the persons or body parts of the person.

The arrangement 100 can be arranged to change the exposure time of the camera 110. The change of the exposure time can be based on a determined distance and/or signal level. This is especially useful in case the arrangement compensates for wrapping as this assures that the exposure time can be adapted to the real distance.

The arrangement 100 can comprise a processing unit 190. The processing unit 190 can be part of the camera 110. The processing unit 190 can be partly or fully outside the camera 110. Part of the processing unit 190 can be in the so-called "cloud". The processing unit 190 can be arranged to perform any of the steps described in relation to method 600. Method 600 is further described in relation to FIG. 6. The processing unit 190 can comprise one or several computers and/or processors.

FIG. 2 shows, in a schematic way, a part aspect of the present disclosure. This aspect is illustrated with the help of a retro-reflective element 165. However, what is said regarding the retro-reflective element 165 can apply to any other light transmitter. In one example, the light transmitter is the area 160. In one example, the light transmitter comprises the area 160. In one example, the retro-reflective element 165 is the area 160. In one example, the retro-reflective element 165 comprises the area 160. When the present disclosure relates to an area 160 on the person 150, it should be understood that the area 160 does not need to be directly on the person 150. The area 160 can be instead or additionally on a garment/piece of clothing on the person. As an example, the area 160 can be on a t-shirt, a gilet, a vest a belt, a clock, a headband, a wristband, shorts, trousers, shoes, or the like.

In a first embodiment, the retro-reflective element 165 and/or the area 160 is rather small compared to the size of the person. This is illustrated by element 165a. This allows for a precise measurement of a part of the person. As an example, the retro-reflective element 165 and/or the area 160 can be placed on an arm, a leg, a hand, a part of the breast, or the like. This allows for measuring exactly that part of the person where the retro-reflective element 165 and/or the area 160 is placed. As an example, when analysing high jump, it might be important to analyse how different parts of the body of the person move in relation to each other. In that case it might be advantageous to put one or several rather small marker(s)/area(s) on one or several specific part(s) of the person.

In a second embodiment, the retro-reflective element 165 and/or the area 160 is rather big and covers a considerably part of the person, such as, for example, a considerable part of the breast or the back of a person. This is illustrated by element 165b. This might be an advantageous arrangement for measurements in the direction to and/or from the camera, such as, for example, sprints. For such kind of sports it might be enough to analyse how the torso moves.

In a third embodiment, the retro-reflective element 165 and/or the area 160 is shaped in the form of a belt. This is illustrated by element 165c. This might be advantageous for movements in different directions, such as team sports, for example football, handball, volleyball, or the like.

FIGS. 3a and 3b show, in a schematic way, embodiments of a light transmitter which can be used in connection to the present disclosure. The light transmitter is illustrated in the form of a retro-reflective marker 165. However, what is said regarding the marker 165 easily applies to other light transmitters. The retro-reflective marker 165 can comprise a number of zones, such as at least two different zones. There is no limit in the number of zones. The different zones can have different reflectance. The different zones can be adapted in their reflectance to assure that at least one of the zones reflects a suitable amount of light to the camera. A suitable amount of light is an amount of light which will neither over- nor underexpose the pixels of the camera. As an example, a first zone is adapted to have a very high reflectance which allows to reflect a suitable amount of light back to the camera at a first distance range between the area and the arrangement. As an example, a second zone is adapted to have a high reflectance which allows to reflect a suitable amount of light back to the camera at a second distance range between the area and the arrangement. The second distance range is smaller in the distances than the first distance range. As an example, a third zone is adapted to have an ordinary reflectance which allows to reflect a suitable amount of light back to the camera at a third distance range between the area and the arrangement. The third distance range is smaller in the distances than the first and the second distance range. As an example, a fourth zone is adapted to have a low reflectance which allows to reflect a suitable amount of light back to the camera at a fourth distance range between the area and the arrangement. The fourth distance range is smaller in the distances than the first, second, and third distance range. This principle can be adapted to any number of zones. This allows to extend the distance range for which a reasonable signal strength is achieved by the arrangement 100. As an example, at a long distance one zone, such as the first zone, might reflect a suitable amount of light back to the camera 110, whereas the other zones will overexpose the corresponding pixels of the camera 110. On the other hand, on short distances another zone, such as the fourth zone, might reflect a suitable amount of light back to the camera 110, whereas the other zones will underexpose the corresponding pixels of the camera 110. For intermediate distances, other zones, such as the second and/or the third zones might reflect a suitable amount of light back to the camera 110, whereas some other zones, such as the first zone, will underexpose the corresponding pixels of the camera 110 and some other zones, such as the fourth zone, will overexpose the corresponding pixels of the camera 110.

The retro-reflectiveness of the marker 165 can assure that the light from the marker is much higher than any other light impinging on the camera 110. This assures that the camera can reduce false measurements due to stray light from other elements.

Referring first to FIG. 3a, the marker can comprise a first zone 170, a second zone 171, a third zone 172, a fourth zone 173, and a fifth zone 174. In one example, the first zone 170 corresponds to the area 160. In the shown example, the first zone has a rectangular shape. In the shown example, the second to the fifth zone have a frame shape and are situated around the respective previous zone. It should be stressed that the figure is only schematically. In one example, the areas of each zone are equal. In one example, the areas of zones with higher reflectance are larger than the areas of zones with lower reflectance. This assures that approximately an equal number of pixels will receive a suitable amount of light irrespective of the distance.

FIG. 3b shows another schematic embodiment of how the marker 165 can look like. In this example, the marker 165 comprises four zones, a first longitudinal zone 180, a second longitudinal zone 181, a third longitudinal zone 182, and a fourth longitudinal zone 183. The zones are longitudinal in the shown example. The zones can have equal or different areas. In one example, the area 160 corresponds to the first zone.

It should be noted that FIGS. 3a and b only are examples. The zones can in principle have any shape. Other possible examples are, for example, round or elliptic zones, vertical or diagonal zones, or the like. One zone does not necessarily need to be connected.

FIG. 4a shows, in a schematic way, the result of a measurement of a movement of a person according to a prior art solution. In the shown example, the result for measuring the movement of a sprinter is illustrated. On the horizontal axis the time is depicted in seconds. On the vertical axis the distance is depicted in metres. As can be seen, so called wrapping occurs at around two seconds, at around three seconds, and slightly before five seconds.

During the wrapping, the distance "jumps", i.e. makes considerably large changes. As can be seen, the measured results are in the range of around 1-10 m, as wrapping occurs for higher distances. In other words, for higher distances the received light cannot be distinguished from light which was emitted from a previous pulse.

FIG. 4b shows, in a schematic way, the result of a measurement of a movement of a person according to an example of the present disclosure. It should be noted that the result of FIG. 4b does not show the same situation as measured in FIG. 4a. In this example, the wrapping is compensated for. As can be seen, the distance now varies in the range of around 4 to 40 metres and does not show any jumps. The wrapping can be compensated for by analysing previously determined distances. This has been explained in relation to FIG. 1. The wrapping can instead or additionally be compensated for by restricting movements in one or two dimensions. As an example, an up-and-down jump of person is usually restricted to movement in one dimension. As an example, a long jump is usually restricted to movement in two dimensions. As an example, a sprint on a lane is usually restricted to one dimension. As an example, running on a field is usually restricted to two dimensions. It is thus possible to compensate for wrapping based on the performed activity of the person.

In one example, it is thus possible to adapt the arrangement 100 to specific activities and/or to starting distances. As an example, when measuring a sprinter, it might be known at which distance the sprinter starts. The arrangement can then be adapted to track the right distance, i.e. to compensate for the wrapping, based on the starting distance and based on at least one previous determined distance and/or based on a priori knowledge of the initial position or distance.

FIG. 5a shows, in a schematic way, a possible image of a camera which could be achieved with a prior art solution. In the middle of the image, horizontal line is depicted with a level of >1000, which in the shown example corresponds to overexposure. This horizontal line corresponds to the pixels which are the corresponding pixels of the area. There are very few pixels above and below the overexposed line (although this cannot be seen directly due to the limited resolution of the colour coding in black-and-white, see below) with a signal strength in between over- and underexposed levels. However, these pixels are still close to the over- or underexposed level, as can be seen by the colour coding. A small number of pixels close to the under- or overexposed level does not allow to determine a distance, partly because since single pixels usually are considered as artefacts, and partly because a determining of the distance with reasonable certainty usually requires averaging the distance over a number of pixels. Therefore, single pixels do not allow a good averaging and would thus result in a high uncertainty of the distance.

FIG. 5b shows, in a schematic way, a possible image of a camera which could be achieved according to an example of the present disclosure. In FIG. 5b a defocusing arrangement has been used to spread the light among several pixels. As a result, none of the pixels are overexposed (although this cannot be seen directly due to the limited resolution of the black-and-white colour coding, see below) and the number of pixels which are neither over- nor underexposed is considerably higher than in the image which is shown in FIG. 5a. This allows determining the distance based on the pixels which are neither over- nor underexposed. Due to the defocusing both the corresponding pixels and the pixels in the vicinity of the corresponding pixels are neither over- nor underexposed.

In FIGS. 5a and 5b, the both axes show the number of a pixel and the scale on the right side shows a colour coding for the signal strength at each pixel. The colour coding here is in the form of a low resolution black and white representation. It should be noted that the horizontal and the vertical lines have different scales in the figures. It should also be noted that FIG. 5a-c only are schematic to illustrate aspects of the present disclosure. Although these figures relate to comparable, i.e. similar situations between images of a prior art solution and a solution according to the present disclosure, they are not produced to show an exact 1:1 correspondence of exactly the same situation.

In one example, the defocusing arrangement is arranged in such a way, that the pixels adjacent to the image of the bright object will be illuminated with an intensity of approximately 10 percent of the intensity of the bright object. As a consequence, the pixels adjacent to said adjacent pixels, i.e. the pixels at a distance of 2 pixels to the image of the bright object, will typically be illuminated with an intensity of approximately 10 percent of the direct adjacent pixels, i.e. of approximately an intensity of 1 percent of the image of the bright object. It should be understood that a factor of 10 in the intensity typically might be a good value. However, a specific factor can depend on the design of the arrangement, and is in one example in the range of 3-30, or in the range of 5-20, or in the range of 7-15. Further, it should be understood that in principle several groups of pixels can be grouped together. Thus, what has been said above regarding one pixels might instead apply to groups of pixels. In one example, the defocusing arrangement will only defocus in one direction, as, for example, described in relation to FIG. 1. In this example, what has been said regarding adjacent pixels will typically only apply to the adjacent pixels in the direction where defocussing occurs.

FIG. 5c shows, in a schematic way, a comparison between an aspect of the present disclosure and a prior art solution. The figure shows the signal strength as the function of a vertical pixel position in FIGS. 5a and 5b, respectively, wherein the horizontal pixel position is kept constant. The vertical axis relates to the signal strength as indicated in FIGS. 5a and 5b. The horizontal axis denotes a pixel position, wherein the curves have been shifted in position so that they are overlapping. In other words, the numbers on the horizontal axis do not correspond to the vertical pixel number in FIGS. 5a and 5b, but are shifted in comparison to these figures. The continuous line represents the situation in FIG. 5a. As can be seen, the prior art solution shows an overexposed peak which corresponds to the area and basically no pixels with at a level which is neither over- nor underexposed. The dashed line represents the situation in FIG. 5b. As can be seen, a solution according to the present disclosure has several pixels in the shown vertical cut which are neither over- nor underexposed.

FIG. 6 shows, in a schematic way, a flowchart of an example of a method 600 according to the present disclosure. The method 600 is a method for measuring the movement of a person. The method is performed repeatedly.

The method 600 starts with the optional step 610 of sending light from a camera arrangement to at least one area on a person. The camera arrangement can be the arrangement 100 which has been described in relation to FIG. 1. The sent light can originate from a TOF-camera. The person can in this step and in any of the following steps incorporate more than one area. Details of the area and the person have been described earlier. In case step 610 is performed, the at least one area is equipped with at least one retro-reflective marker. The retro-reflective marker can comprise different zones. This has previously been described. The method continues with step 620.

In step 620 light from the at least one area on a person is transmitted to the camera arrangement which comprises a camera. In one example, the transmitting of light from the at least one area to the camera arrangement is achieved via the at least one retro-reflective marker which reflects back the sent light from the camera arrangement. In one example, the transmitting of light is achieved via a light source. In one example, the light source is on the person. The light source can emit light. The light can be a pulsed light source. In one example, the pulsed light source is synchronised in its pulsing frequency with the camera arrangement, such as with the camera in the camera arrangement. Step 620 can comprise emitting light from the at least one area to the camera arrangement. Step 620 can comprise reflecting light from the at least one area to the camera arrangement. The method continues with step 630.

Step 630 comprises adapting the transmitted light in such a way that different signal strengths between the corresponding pixels in the camera and pixels in the vicinity of the corresponding pixels are achieved. The term corresponding pixels has been previously defined. The adapting is performed so that at least some of the corresponding pixels and the pixels in the vicinity of the corresponding pixels are neither over- nor underexposed. Step 630 can comprise step 631 of providing a retroreflective marker with different zones, wherein different zones have different reflectance, for performing the adapting. Step 630 can comprise step 632 of defocusing, diffracting, refracting or diffusing the transmitted light in the camera arrangement such that the adapting is achieved. The method continues with step 640.

In step 640 at least one distance between the at least one area on the person and corresponding pixels in the camera is determined based on the transmitted light. This is in one example performed via a TOF method. This is in one example performed via measuring how long time it takes for a light pulse to travel from the camera arrangement to the at least one area and back. This is in one example performed via measuring how long time a light pulse travels from the at least one area to the camera arrangement. This is especially suitable in case a transmission from the area to the camera arrangement is synchronised with a time trigger in the camera arrangement. The determining of the at least one distance is based on at least some of the corresponding pixels and the pixels in the vicinity of the corresponding pixels which are not overexposed.

The determining of the distance can be based on the design of at least one marker. As an example, as described before, different zones of the marker can provide a suitable amount of light to the camera at different distances. Thus, the pattern for the pixels which are exposed for a reasonable amount of light might change. For example, when the suitable amount of light changes from being provided by the first zone 170 in FIG. 3a to being provided by the second zone 171 in FIG. 3b, the pixel pattern will change from a rectangular pattern to a frame-like pattern, assuming no defocusing is used. Having knowledge of the design of the markers, one can then use that knowledge to predict in what way the pattern can change. This can especially be useful in case the distance between the camera arrangement and more than one area is determined. This can be used to track the right areas through the repeated determining of the distances.

Step 640 can comprise step 641 of compensating for potential wrapping based on at least one previously determined distance. This has already been described in more detail in relation to the previous figures. Step 641 can comprise restricting to movements to one or two dimensions. Step 641 can comprise tracking at least one of the determined distances from previous iteration(s) of method 600. The compensation can be based on the tracking and/or the restricting. Step 641 can comprise making at least one assumption regarding possible movements of the person, for example regarding speed and/or direction of the possible movements. The compensation can be based on the at least one assumption.

After step 640 the method 600 is repeated. The method 600 can comprise measuring the movement based on the repeatedly determined distances. The method can comprise analysing the movement based on the measured movements. The analysis can comprise a comparison between movements of different persons. The analysis can be used for improving performances of a person. The method 600 can comprise the step of using the determined distances and/or the measured movement as input to an electronic game and/or an electronic application, such as a virtual reality application. Especially, the method 600 might enable electronic games where gamers move over larger areas.

The method 600 can comprise the step of varying the exposure time of the camera. In one example, two or more exposures are used to build up the full image.

The method 600 might be repeated at least 5 times per second, more preferably at least 10 times per second, and even more preferably at least 20 times per second. The method can be performed in real-time. The method can be performed time-delayed. As an example, step 640 can be performed at a later moment of time compared to the other steps. As an example, when measuring the movement of a person performing sport, it might not be needed to have the measurement immediately ready. Instead it might be sufficient to have the measurement result in connection to a debriefing.

The method, the arrangement, and the system have mainly been described in relation to sports. It should, however, be emphasised that the present disclosure is not restricted to sports. A measurement of a movement of a person can equally well be performed in relation to games, especially electronic games, in relation to physiotherapy, or in any other context where a measurement of a person is useful.

The foregoing description of the preferred embodiments of the present invention is provided for illustrative and descriptive purposes. It is neither intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

It should especially be noted that the system and/or arrangement according to the present disclosure can be arranged to perform any of the steps or actions described in relation to the method 600. It should also be understood that the method according to the present disclosure can further comprise any of the actions attributed to an element of the system 200 described in relation to FIG. 1. The same applies to the computer program product and the computer-readable medium.

The disclosure has been described in relation to measuring the movement of a person. It should, however, be noted that the idea of the present disclosure also can be applied to any object. The object does not have to be a person. Thus, everything described in relation to a person can be applied to an object. As an example, the area 160 can then be on the object.

LIST OF ELEMENTS

100 Camera arrangement
110 Camera
120 Distance
130 Light
140 Light
150 Person
160 Area
165 Retro-reflective marker
170 First zone
171 Second zone
172 Third zone
173 Fourth zone
174 Fifth zone
180 First longitudinal zone
181 Second longitudinal zone
182 Third longitudinal zone
183 Fourth longitudinal zone
190 Processing unit
200 System

The invention claimed is:

1. A camera arrangement for measuring a movement of a person, wherein the camera arrangement comprises a camera and is arranged to repeatedly:
   determine at least one distance between at least one area on said person and corresponding pixels in the camera based on light received from said at least one area;
wherein
the camera arrangement is adapted to:
   receive different signal strengths between said corresponding pixels in the camera and pixels in the vicinity of said corresponding pixels so that at least some of said corresponding pixels and said pixels in the vicinity of said corresponding pixels are neither over- nor underexposed, and
   base said determining of said at least one distance on at least some of said corresponding pixels and said pixels in the vicinity of said corresponding pixels which are neither over- nor underexposed, and
wherein the camera arrangement further comprises a defocusing arrangement, the defocusing arrangement being adapted to defocus light received by said camera to distribute light in multiple directions, so that different signal strengths between said corresponding pixels in said camera and pixels in the vicinity of said corresponding pixels are received so that at least some of said different signal strengths do neither relate to over- nor to underexposure.

2. The arrangement according to claim 1, wherein the defocusing arrangement is adapted to defocus light that is dependent upon a direction of movement of said person.

3. The arrangement according to claim 1, wherein the camera is a time of flight camera.

4. The arrangement according to claim 1, being adapted to repeat said determining at least 5 times per second, more preferably at least 10 times per second, and even more preferably at least 20 times per second.

5. A system for measuring a movement of a person, the system comprising:
   a camera arrangement according to claim 1; a light transmitter at said person being arranged to transmit light from said at least one area on said person to said camera arrangement.

6. The system according to claim 1, wherein light received by the camera is defocused by the defocusing arrangement in basically only one dimension.

7. The system according to claim 5, wherein said light transmitter is a retro-reflective element.

8. The system according to claim 7, wherein the retro-reflective element comprises different zones with different reflectance.

9. A method for measuring a movement of a person, the method comprising the following steps which are performed repeatedly:
   transmitting light from at least one area on a person to a camera arrangement which comprises a camera;
   determining at least one distance between said at least one area on said person and corresponding pixels in the camera based on the transmitted light; wherein
the method further comprises the steps of:
   adapting said transmitted light in such a way that different signal strengths between said corresponding pixels in the camera and pixels in the vicinity of said corresponding pixels are achieved, so that at least some of said corresponding pixels and said pixels in the vicinity of said corresponding pixels are neither over- nor underexposed, wherein said determining of said at least one distance is based on at least some of said corresponding pixels and said pixels in the vicinity of said corresponding pixels which are not overexposed; and
   defocusing said transmitted light in the camera arrangement such that said adapting is achieved by spreading light among the at least some of said corresponding pixels and said pixels in the vicinity of said corresponding pixels which are not overexposed.

10. The method according to claim 9, wherein the defocusing of light is made in only one dimension.

11. The method according to claim 9, wherein the method further comprises the step of:
   sending light from said camera arrangement to said at least one area on said person; and
   wherein said at least one area is equipped with at least one retro-reflective marker, and wherein said transmitting of light from said at least one area to said camera arrangement is achieved via said retro-reflective marker which reflects back said sent light from said camera arrangement.

12. The method according to claim 9, further comprising the step of: compensating for potential wrapping based on at least one previously determined distance.

13. A non-transitory computer program product comprising instructions which, when the program is executed by a computer, cause the computer to carry out the method of claim 9.

14. A non-transitory computer-readable medium comprising instructions which, when executed by a computer, cause the computer to carry out the method of claim 9.

\* \* \* \* \*